United States Patent [19]
Shriver

[11] Patent Number: 5,860,358
[45] Date of Patent: Jan. 19, 1999

[54] CONE CAKE BAKING APPARATUS

[76] Inventor: Ronald Shriver, 93 Weyand Ave., Buffalo, N.Y. 14210

[21] Appl. No.: 800,217

[22] Filed: Feb. 12, 1997

[51] Int. Cl.[6] .............................. A47J 37/01; A47J 37/04
[52] U.S. Cl. ................................ 99/426; 99/448; 99/383; 211/74
[58] Field of Search .............................. 99/449, 383, 450, 99/446, 424, 440, 448; 211/175, 60.1, 13.1, 74

[56] References Cited

U.S. PATENT DOCUMENTS 3,424,076  1/1969  Bernatz et al. ............................ 99/426
5,286,949  2/1994  Simons .................................. 99/440 X
5,450,785  9/1995  Westbrooks ............................... 99/426

OTHER PUBLICATIONS

Side Label on a JOY Cone Box, Referencing Ice Cream Cup Cakes, 1997.

*Primary Examiner*—Reginald L. Alexander
*Attorney, Agent, or Firm*—The Bilicki Law Firm, P.C.

[57] ABSTRACT

A cone cake baking apparatus comprising: a horizontal baking tin having a plurality of circular openings, a vertical first side wall, and a vertical second side wall; and the first and second side walls each having a securing portion.

5 Claims, 5 Drawing Sheets

CONE CAKE BAKING APPARATUS

FIELD OF THE INVENTION

The present invention relates to a cone cake holder for baking cone cakes.

BACKGROUND

While it is well known in the prior art to utilize cup cake trays for baking cupcakes, the public domain does not contain an adequate apparatus for baking cone cakes. In particular, in order to cook a cone cake having a pointed bottom with available apparatus, it is necessary to fill the cone with cake material and place the cone cakes in a vertical position, lying down, on a cookie sheet. Moreover, while standard cupcake trays will more easily facilitate a flat bottom cone, baking such cones in cupcake trays often results in spillage or tipping of the cones during the baking process.

SUMMARY OF THE INVENTION

The present invention comprises an apparatus for baking cone cakes comprising generally a horizontal baking tin having a plurality of circular openings, a first side wall integral with said horizontal tin, and a second side wall containing an adjustment portion to enable the apparatus to accommodate varying size drip tins. Furthermore, the bottom portion of each side wall contains a securing means capable of temporarily securing standard baking tins, utilized as drip tins, to the bottom portion of the apparatus during the baking cycle.

Moreover, both side walls extend downward in a consistent manner from the baking tin and are of sufficient length to enable, when temporarily engaged with a standard baking tray at their respective bottom ends, to provide a sufficient open space to house the portion of one or more cones that extends downward through the circular openings in the top baking tin.

An alternative embodiment of the present invention comprises generally a horizontal baking tin having a plurality of circular openings, and two side walls extending downward therefrom, each side wall integral with said horizontal baking tin, and each side wall having a bottom portion and a horizontal lip extending inward from said bottom portion.

OBJECTS OF INVENTION

It is, therefore, an object of the present invention to provide an apparatus for baking cone cakes.

It is a further object of the present invention to provide an apparatus to facilitate baking cone cakes in an upright manner without the bottom portion of such cone cakes being in contact with other cone cakes or portions of a baking tin during the baking cycle.

It is a further object of the present invention to provide an apparatus for baking cone cakes which is adjustable.

It is a further object of the present invention to provide an apparatus for baking cone cakes which is of adequate size to fit in a standard oven.

It is a further object of the present invention to provide an apparatus for baking cone cakes that can utilize any standard baking tin as its lower tray.

DETAILED DESCRIPTION OF THE PREFERRED EMBODIMENTS

Figure 1:
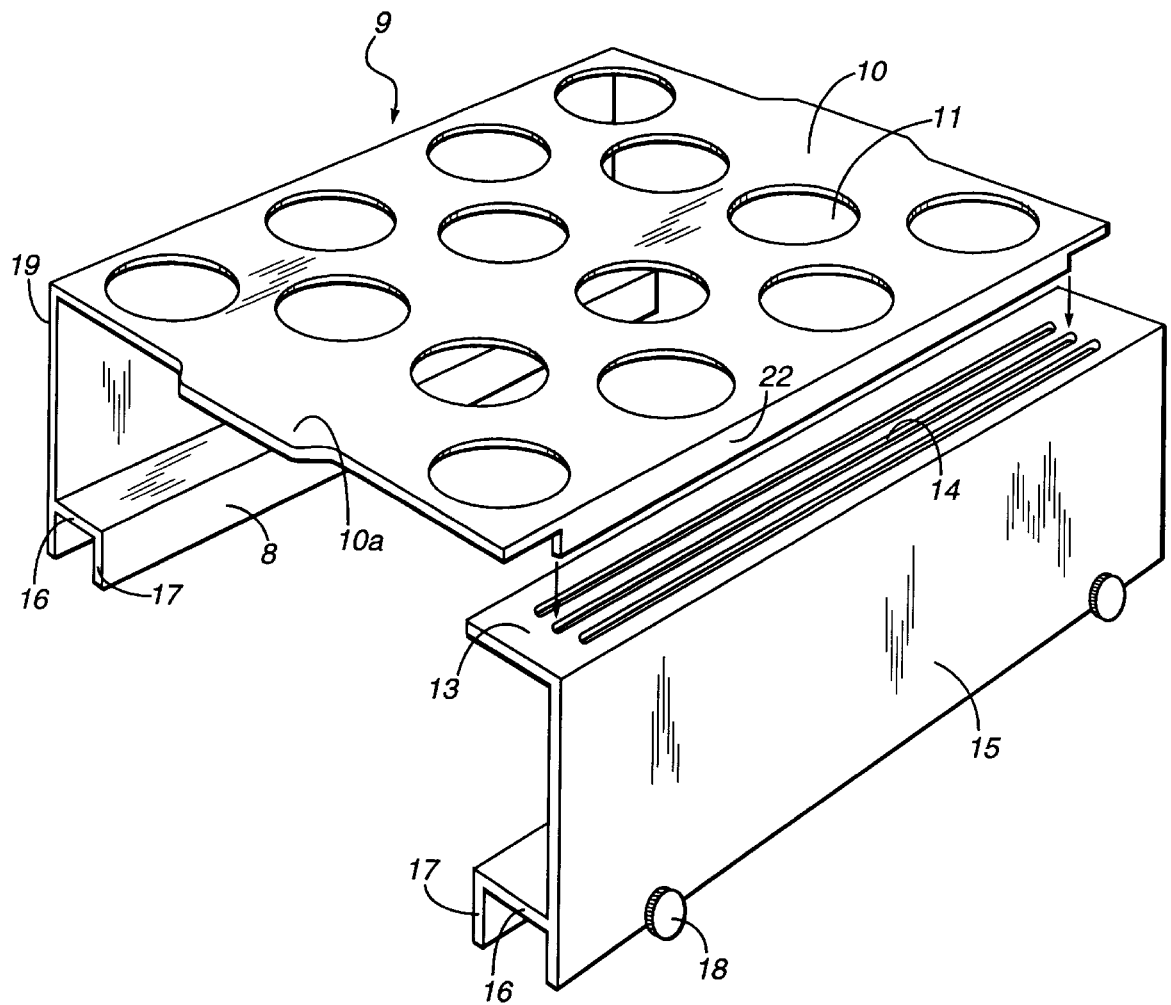
FIG. 1 is a diagonal elevational view of the cone cake baking apparatus.

As shown in FIG. 1, cone cake baking apparatus 9 is comprised generally of a horizontal baking tin 10, a first side wall 19 integral with baking tin 10, and an adjustable side wall 15.

Horizontal baking tin 10 is comprised of a plurality of circular openings 11, two handle portions 10a, and an insertion portion 22 extending downward from baking tin 10.

First side wall 19 extends downward from baking tin 10. First side wall 19 contains a securing means 8 at its lower most point having a vertical portion 16 coupled with a horizontal portion 17 and preferably two securing bolts 18 (shown in FIG. 3, as well as here on adjustable side wall 15) with corresponding securing holes 18a (not shown) for threadable engagement therewith.

Adjustable side wall 15 is comprised of an inward facing horizontal receiving portion 13 having a plurality of receivers 14 passing through receiving portion 13 for mating engagement with insertion portion 22 of horizontal baking tin 10. Receiving portion 13 is preferably comprised of three receivers 14. In operation, insertion portion 22 may be moved to different receivers 14 depending upon the width of a bottom tin such as a cookie sheet 23 (shown in FIGS. 3, 4, and 5).

Adjustable side wall 15 further comprises a securing means 8, identical in structure to securing means 8 of first side wall 19 having a vertical portion 16 coupled with a horizontal portion 17, and preferably two securing bolts 18 with corresponding securing holes 18a for threadable engagement therewith.

Figure 2:
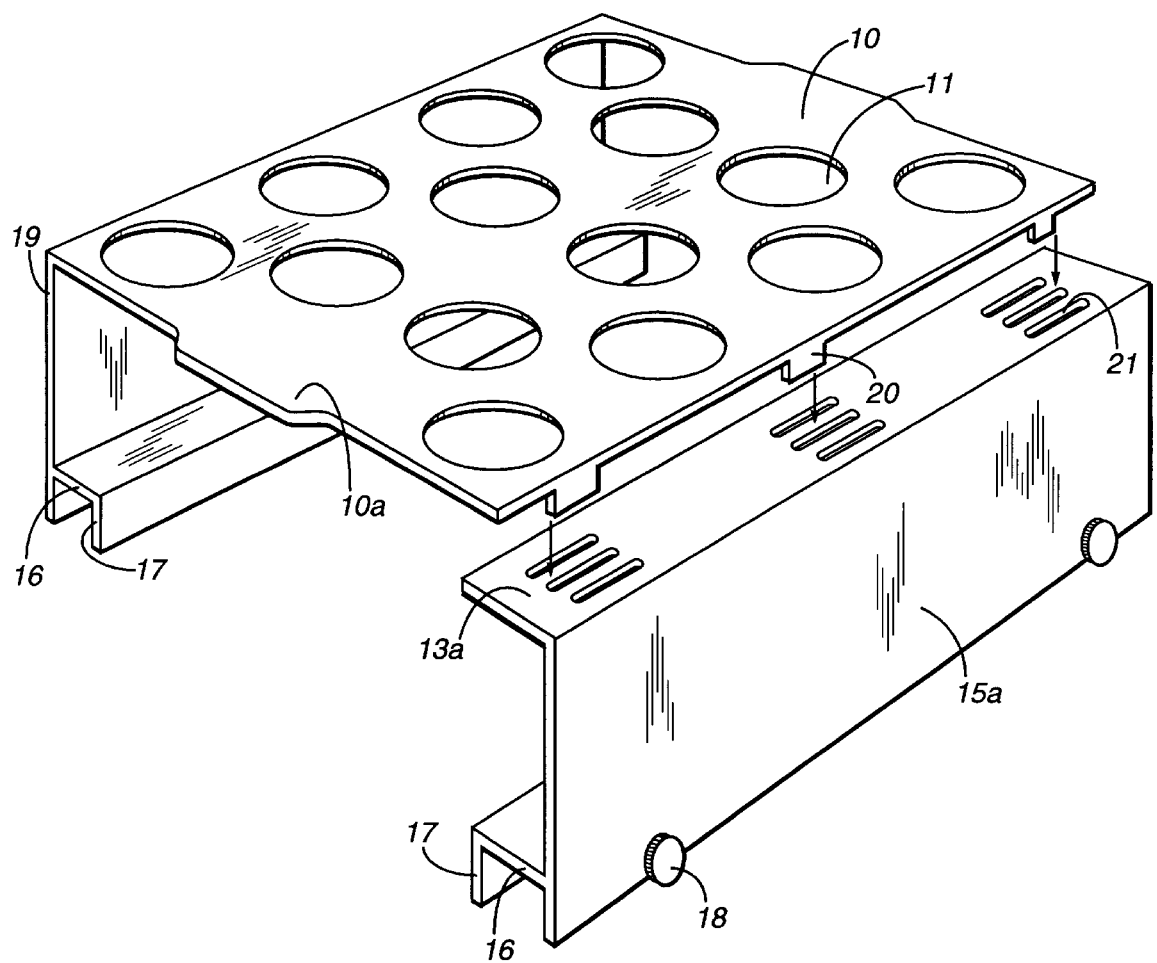
FIG. 2 is a diagonal elevational view of an alternative embodiment of the cone cake baking apparatus.

As shown in FIG. 2, an alternative embodiment of the present invention is in all other respects the same as shown in FIG. 1, except is comprised of multiple insertion portions 20 extending downward from horizontal baking tin 10, as well as multiple receivers 21 on receiving portion 13a of adjustable side wall 15a.

Figure 3:
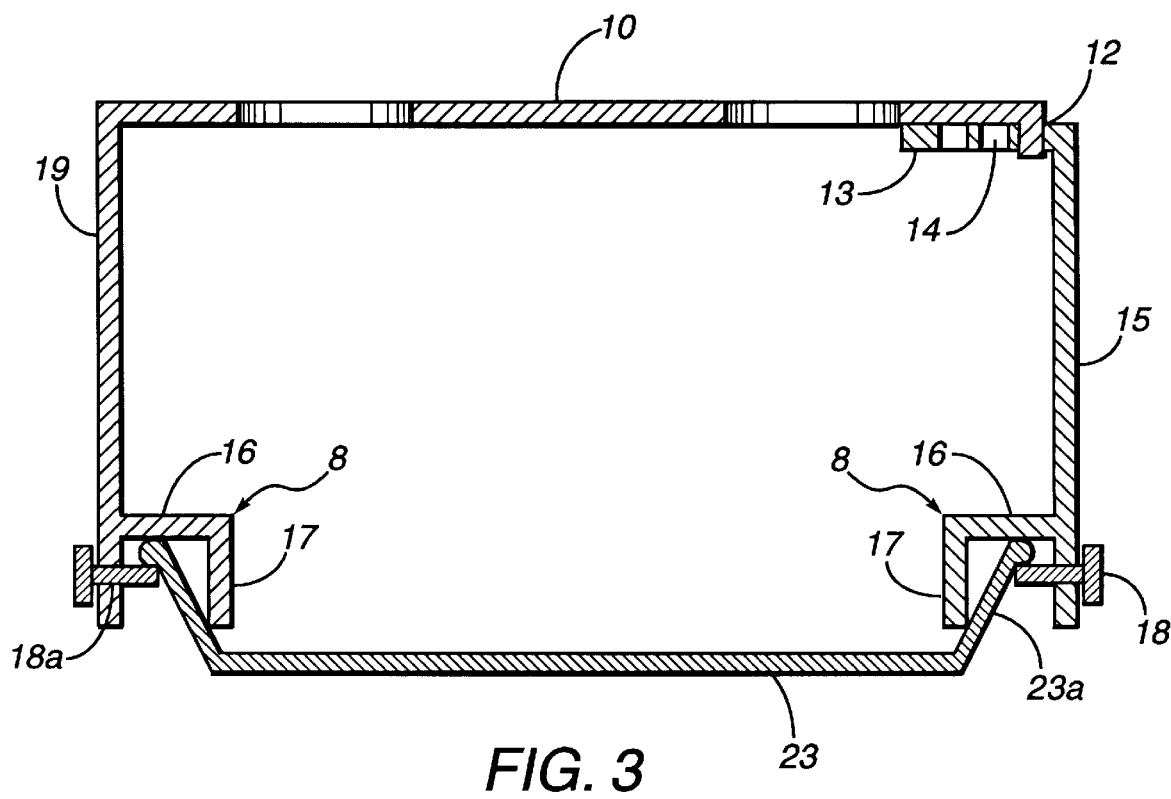
FIG. 3 is a cross sectional view of the cone cake baking apparatus showing the securing means.

As shown in FIG. 3, a standard cookie sheet 23 may be used as the bottom tray by placing walls 23a within securing means 8 and tightening bolts 18 against walls 23a.

Figure 4:
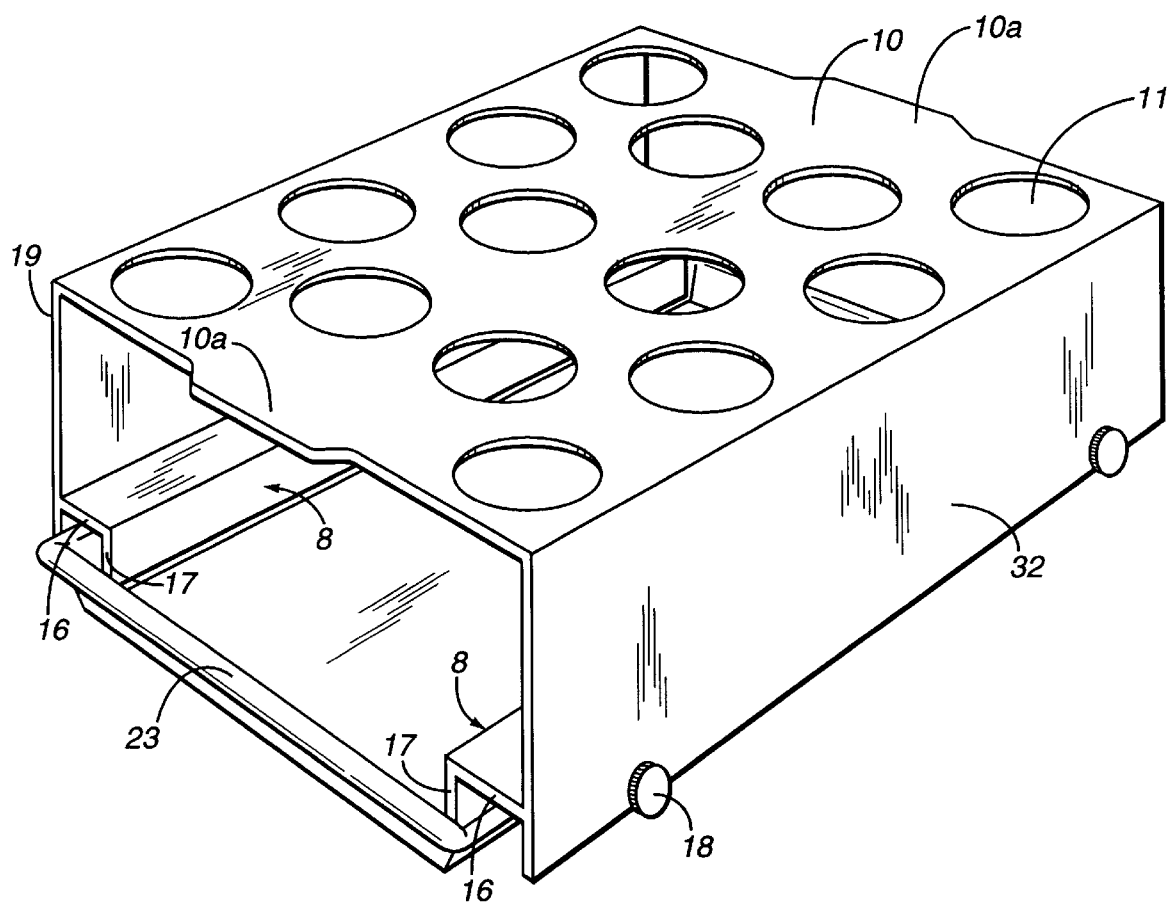
FIG. 4 is a front/side elevational view of an alternative embodiment of the cone cake baking apparatus.

As shown in FIG. 4, a second alternative embodiment is non-adjustable and comprised of a first side wall 19, securing means at the bottom of each side wall 19 and 32, and a horizontal baking tin 10 having handles 10a and a plurality of circular openings 11. Second side wall 32 integral with horizontal baking tin 10 and extending downward therefrom.

Figure 5:
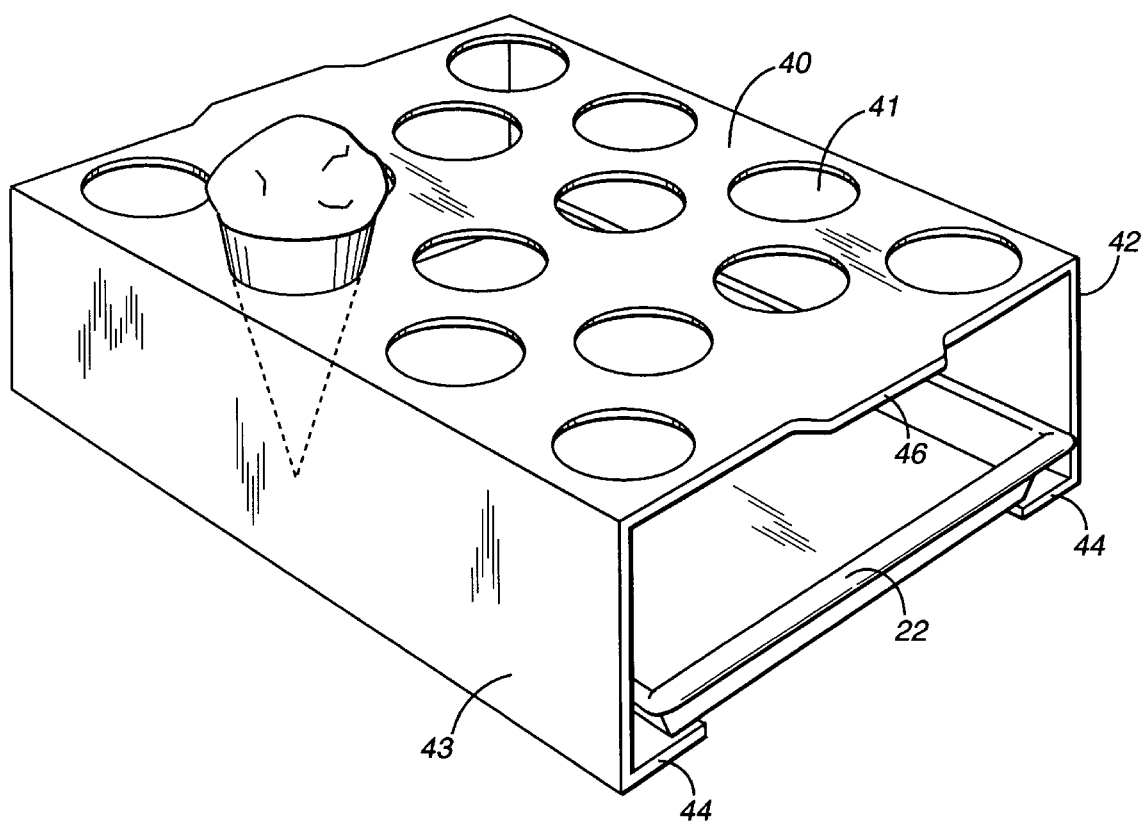
FIG. 5 is a front/side elevation view of an alternative embodiment of the cone cake baking apparatus.

As shown in FIG. 5, a third alternative embodiment is a non-adjustable one piece apparatus comprised of a horizontal baking tin 40 having a plurality of circular openings 41 and handles 46, a first side wall 42, a second side wall 43, and a grasping portion 44 extending horizontally inward from each side wall 42 and 43. In operation, a cookie tray 22 may be placed above grasping portions 44 during baking of cone cakes.

The present invention is preferably comprised of a cooking material such as a tin or aluminum compositions.

It will be appreciated that various modifications to the inventive concepts may be apparent to those skilled in the act without departing from the spirit and scope of the invention.

I claim:

1. An apparatus for holding and baking one or more cakes inside of one or more corresponding cones, comprising:

a first generally "L" shaped member comprising a first vertical wall section having a first integral channel at a lower end thereof, and also having a baking tin section emanating generally perpendicularly from an upper end of said first vertical wall section, said tin section having a plurality of apertures therein operatively arranged to hold said one or more cones, said tin section also having a male locking member extending downwardly from one end thereof, said male locking member disposed generally parallel to said first vertical wall section; and, a second member comprising a second vertical wall section having a second integral channel at a lower end thereof and a flange extending generally perpendicularly from an upper end of said second vertical wall section, said flange having a plurality of spaced apertures, each of which apertures is arranged to receive said male locking member to lock said first generally "L"-shaped member to said second member.

2. The apparatus recited in claim 1 further comprising a handle integral with said baking tin.

3. A cone cake baking apparatus for use with a conventional baking tin comprising:

a horizontal baking tin having a plurality of circular openings and an insertion portion, a vertical first side wall integral with the horizontal baking tin, and a vertical second side wall wherein said vertical second side wall is adjustable and comprises a receiving portion for securedly mating with the insertion portion of the horizontal baking tin;

said first and second side walls each further having a channel member disposed opposite from the horizontal baking tin.

4. The apparatus recited in claim 3, wherein said channel member is comprised of a vertical member, a horizontal member, and at least one securing bolt;

said horizontal member integral with the vertical side wall;

said vertical member integral with the horizontal member;

said securing bolt fixedly securing a conventional baking tin to the channel member.

5. The apparatus recited in claim 3, wherein the horizontal baking tin further comprises at least one handle integral with the horizontal baking tin.

\* \* \* \* \*